Figure 1:
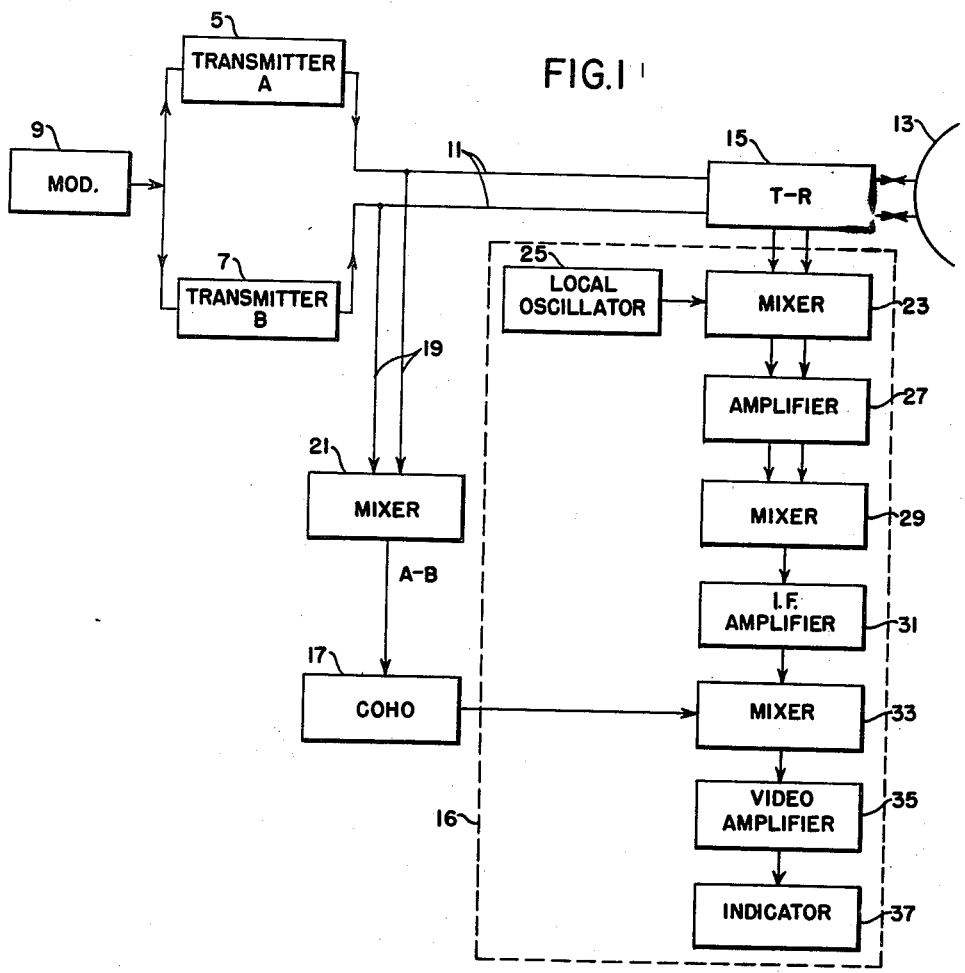

INVENTOR.
ROBERT A. McCONNELL
BY William D. Hall.
ATTORNEY

Patented Nov. 3, 1953

2,658,195

UNITED STATES PATENT OFFICE 2,658,195

MOVING TARGET INDICATING RADAR SYSTEM

Robert A. McConnell, Cambridge, Mass., assignor, by mesne assignments, to the Government of the United States of America as represented by the Secretary of War Application October 19, 1945, Serial No. 623,395

6 Claims. (Cl. 343—7.7)

The present invention relates to a radio object locating system of the character adapted to distinguish fixed objects from moving objects, and it relates more particularly to such a system wherein exploratory pulses of radiant energy are simultaneously transmitted at two different carrier frequencies.

In the usual type of radio object locating system where short duration high carrier frequency exploratory pulses of radiant energy are transmitted and corresponding echo pulses are received, there is no way of readily distinguishing stationary objects from moving objects. The result is that echoes from certain objects are often lost in or obscured by ground clutter, and echoes from fixed objects such as buildings, trees, and hills. To overcome this disadvantage, systems have been devised whereby the phase characteristics of the echoes enable a moving object to be distinguished from a fixed object.

One type of system which distinguishes fixed object echoes from moving object echoes is known as a coherent pulse echo system. In general, systems of this character operate by transmitting high carrier frequency exploratory pulses of radiant energy in the usual manner. Coincident with transmission of the pulses and synchronized thereto are continuous waves or interrupted continuous wave reference oscillations locally generated at the receiver. The reference oscillations are synchronized with the carrier wave of the exploratory pulses so that the reference oscillations are locked in a fixed phase relation to the carrier wave, whereby any phase shift of the carrier wave produces an equal phase shift of the reference oscillations. As the exploratory pulses thus have a fixed phase relation with respect to the reference oscillations, echo pulses returning from an object likewise have a similar phase relation. For pulses returned by a moving object, successive echo pulses have a changing phase relative to the reference oscillations, the amount of this relative phase change from pulse to pulse depending upon the relative velocity of the object and the radio object locating system.

If the echo pulses returning from a moving object are combined with the reference oscillations, said reference oscillations are periodically reinforced and opposed, the degree of reinforcing or opposing action of each echo pulse depending upon the aforesaid relative phase. By detecting the resulting combination of the reference oscillations and the returned echo pulses, video pulses may be obtained, said video pulses having a periodic variation in amplitude, and the rate of variation depending upon the relative velocity of the object and the radio object locating system.

If the object is not moving, however, the echo pulses returning from that object will always have the same phase relative to the reference oscillation, and succeeding echo pulses will therefore always have the same reinforcing or opposing effect. It can be seen therefore that video pulses representing moving objects have a periodic variation in amplitude whereas video pulses representing fixed objects have a fixed amplitude.

The term "coherent pulse echo system" refers to a system as described above wherein the reference oscillations are locked in synchronism (in coherence) with the transmitted exploratory pulses.

It is an object of the present invention to provide an improved coherent pulse echo system which is adapted to simultaneously transmit, at two different carrier frequencies, exploratory pulses of radiant energy.

It is another object of the present invention to provide an improved coherent pulse echo system of the dual frequency type which provides an increase in the available power when transmitting tube size is a limiting factor in design.

Figure 2:
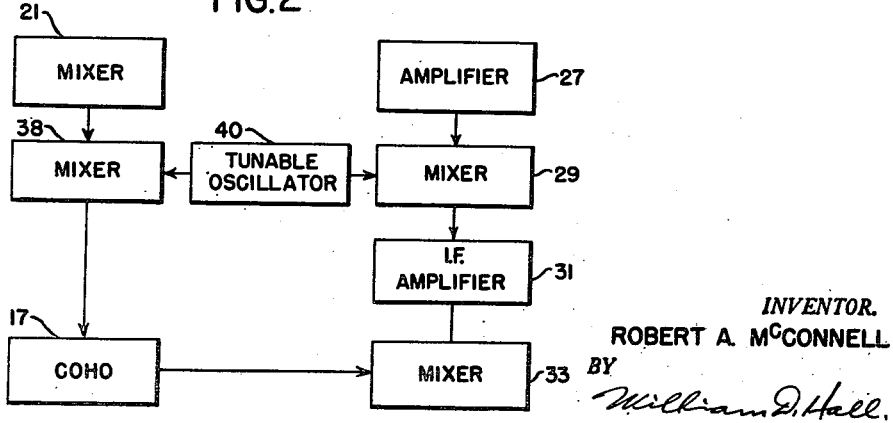

The invention, however, will be more fully understood from the following description when considered in connection with the accompanying drawing, wherein:

Fig. 1 is a block diagram of a coherent pulse echo system showing one particular embodiment of the present invention; and Fig. 2 is a block diagram of a modified portion of Fig. 1.

Referring to the drawing, two simultaneously pulsed transmitters 5 and 7 providing high power short duration pulses of radiant energy, and operating at the frequencies A and B respectively may be driven by a common modulator 9 as indicated. The signal transmission from transmitters 5 and 7 may be provided by dual feed line 11 feeding a single directional antenna 13 as shown, although separate antennas may be used if desired. Transmission may also be accomplished by a dual feed to a single line feeding a single directional antenna.

A transmit-receive switch 15 is interposed in line 11 to connect transmitters 5 and 7 to directional antenna 13 during transmission of the pulses, and to disconnect receiver 16 from transmitters 5 and 7. During the interval between transmitted pulses, and while echo pulses are being received, these connections are reversed, antenna 13 being disconnected from transmitters 5 and 7 and being connected to receiver 16.

The transmitter frequencies A and B may be adjusted so that the difference frequency (A—B) is the desired frequency for coherent oscillator (Coho) 17. A coherent oscillator, or coho as it is hereinafter referred to, is an oscilaltor providing continuous wave or interrupted continuous wave reference oscillations. The oscillatory output therefrom is locked in synchronism (in coherence) with the difference frequency output of the mixer 21, so that the carrier waves of the transmitted exploratory pulses always have a fixed phase relative to the reference oscillations, and if one carrier wave shifts its phase relative to the other carrier wave the phase of the reference oscillations will shift an equal amount.

A portion of each transmitted exploratory pulse from transmitter A and transmitter B may be fed through connection 19 and applied to mixer 21, the beat frequency output of said mixer being a single pulse having carrier frequency substantially equal to the difference of the carrier frequency of the two input pulses. The output of mixer 21 is then applied to coho (coherent oscillator) 17 as a locking pulse therefor. The thus synchronized coho is designed to operate at a frequency substantially equal to the carrier frequency of the pulse issuing from mixer 21. By way of example, transmitter 5 may be tuned so that frequency A is equal to 3030 megacycles, and transmitter 7 be tuned so that frequency B is equal to 3000 megacycles. Coho 17 is then designed to operate at substantially the intermediate frequency which in this particular example is 30 megacycles.

Returning echo pulses received at directional antenna 13 are passed through transmit-receive switch 15 to mixer 23. Also fed into mixer 23 is a continuous wave output from local oscillator 25 wherein said oscillator operates at a frequency of the same general order of the carrier frequency of the transmitted pulses. If, as in the example above, transmitters 5 and 7 are tuned to operate at 3030 megacycles and 3000 megacycles respectively, the frequency of the oscillations issuing from local oscillator 25 may be of the order of 2700 megacycles.

The output of mixer 23 then consists of dual pulses which in the stated example are at 300 and 330 megacycles respectively, and these may be fed to broad band amplifier 27 and amplified thereby. The output of said amplifier may then be applied to mixer 29 wherein the dual echo pulses are caused to beat with one another to produce a single echo pulse at an intermediate frequency. The pulse at this intermediate frequency which in the present example is 30 megacycles may be further amplified in a suitable intermediate frequency amplifier 31 and applied as an input to mixer 33. A second input to mixer 33 comprises reference oscillations from coho 17.

The two inputs to mixer 33 are algebraically combined therein where they reinforce or oppose one another to a degree depending on their relative phase, the result of said mixing being a pulse superimposed on the reference oscillations. This combined signal is then detected in mixer 33 to provide an output consisting of video pulses, the amplitude of the video pulses being dependent upon the degree of reinforcing or opposing action between the input pulses and the reference oscillations. As heretofore described, the degree of reinforcing or opposing action is dependent upon the relative phase of the input pulses and the reference oscillations. The video output from mixer 33 may then be amplified by video amplifier 35, the output of which is applied to indicator 37.

Indicator 37 may comprise a cathode ray tube and provide a visual indication of both fixed amplitude and varying amplitude pulses, or on the other hand, it may be a visual indicator responsive only to varying amplitude pulses and thereby provide an indication of moving objects only. As the frequency of the modulation envelope of a plurality of video pulses manifesting a moving object is a function of the relative velocity between the object and the radio object locating system, velocity information may be obtained. If desired, this may be presented by an aural indicator responsive to the frequency of the modulation envelope.

In the usual single carrier frequency type of coherent pulse echo system, a local oscillator is present. It is necessary that this oscillator operate at a frequency of the order of the carrier frequency of the exploratory pulses, and it is further necessary that it have a high degree of frequency stability. The dual frequency system herein described obviates this stability requirement, and any variations caused by local oscillator 25 will cancel out when the returned echo pulses beat together in mixer 23. Furthermore, oscillations from local oscillator 25 need not beat with the transmitted pulses to provide a suitable locking pulse for the reference oscillator, (echo 17) as in this instance the pulse output of mixer 21 is suitable for synchronizing.

It was previously mentioned that the transmitter frequencies A and B could be so adjusted that the difference frequency (A—B) is the desired intermediate frequency from coho 17. To obviate the necessity for variable tuning of either of the transmitters, a tunable oscillator and mixer may be added to the circuit. This modification is illustrated in Fig. 2 where said figure shows only a portion of the system and where like reference numerals designate like parts. Mixer 38 and tunable oscillator 40 are the added elements, mixer 38 being inserted in the connection between mixer 21 and coho 17. The tunable oscillator 40 has two outputs; one being applied as an additional input to mixer 29, the other being applied as an input to additional mixer 38. A second input to mixer 38 consists of the pulse output from mixer 21. The provision of tunable oscillator 40 and mixer 38 modifies the carrier frequency of the signal issuing from mixer 21 and this modified signal is then applied to coho 17. The additional oscillations applied to mixer 29 from tunable oscillator 40 likewise modify the output of mixer 29.

Although tunable oscillator 40 would have to be frequency-stable, it would be operated at a frequency more nearly that of the intermediate frequency rather than one of the order of the transmitted frequency, thereby making said oscillator more susceptible to ready stabilization. Transmitters A and B would then be tuned to provide any desired difference frequency and the desired intermediate frequency would be obtained by variation of the tunable oscillator. In addition to the advantages just discussed, the dual frequency system as herein described substantially increases the amount of available power when the transmitting tube size may be a limiting factor in design.

Having thus described the invention, what is claimed as new and desired to be secured by Letters Patent is:

1. A pulse-echo radio object-locating system including means for generating radiant energy at two different frequencies, a common modulator therefor to provide as an output from said generating means relatively short-duration pulses of radiant energy, means for transmitting said pulses, a mixer for beating together a portion of said generated pulses to derive a beat frequency pulse, a reference oscillator producing reference oscillations having a frequency substantially equal to said beat frequency, means for locking the phase and frequency of said reference oscillations into synchronism with said beat frequency pulse, means for receiving object-returned echo pulses, a local oscillator, a second mixer, means for applying the output of said local oscillator to said second mixer, means for applying said object-returned echo pulses to said second mixer to obtain therefrom echo pulses having a reduced carrier frequency, a third mixer, means for applying said reduced carrier frequency pulses to said third mixer to obtain therefrom a single beat frequency pulse having an intermediate carrier frequency equal to the difference frequency of the input pulses to said third mixer, means for obtaining a combination of said beat frequency pulses and said reference oscillations, a detector connected to the last named means for deriving the resultant of said combination to provide video pulses, and indicating means for utilizing at least a portion of said video pulses.

2. A pulse echo radio object locating system, including means for simultaneously generating and radiating, at two different carrier frequencies, short duration high carrier frequency pulses of radiant energy, means for receiving object-returned echo pulses, means for reducing the carrier frequencies of said echo pulses, means for deriving beat frequency pulse-echo signals from the reduced echo pulses, said beat frequency being substantially equal to the difference of said carrier frequencies, means for generating reference oscillations having a frequency substantially equal to said beat frequency, means for controlling the phase of said reference oscillations in response to the carrier waves of said generated pulses, means for combining said reference oscillations and said beat frequency pulses to obtain video pulses, and means for indicating at least a portion of said video pulses.

3. In a pulse-echo radio object-locating system, means for substantially simultaneously generating and radiating, at two different carrier frequencies, short-duration high carrier frequency pulses of radiant energy, means for receiving object-returned echo pulses, means for deriving a beat frequency pulse-echo signal from said echo pulses, said beat frequency being substantially equal to the difference of said carrier frequencies, means for generating reference oscillations having a frequency substantially equal to said beat frequency, means for controlling the phase of said reference oscillations in response to the carrier waves of said generated pulses, means for combining said reference oscillations and said object-returned pulses to obtain pulse signals superimposed upon said reference oscillations, means for detecting said combination to obtain video pulses, and means for indicating at least a portion of said video pulses.

4. In a pulse-echo radio object-locating system, means for simultaneously generating and radiating at different carrier frequencies short-duration high carrier frequency pulses of radiant energy, means for receiving object-returned echo pulses, means for deriving beat frequency pulse signals from said echo pulses, means synchronized by said generated pulses for obtaining reference oscillations, and means for combining said reference oscillations and said beat frequency pulse signals to obtain video pulses.

5. In a pulse-echo radio object-locating system, means for substantially simultaneously transmitting, at two different carrier frequencies, short-duration high carrier frequency pulses of radiant energy, means for receiving object-returned echo pulses, means for deriving a beat frequency pulse-echo signal from said echo pulses, said beat frequency being substantially equal to the difference of said carrier frequencies, an intermediate frequency amplifier, a tunable oscillator, means for combining the output of said oscillator with said beat frequency signal to obtain pulse signals having a second beat frequency equal to said intermediate frequency and impressing said second beat frequency pulse signal on said intermediate frequency amplifier, means for generating reference oscillations having a frequency substantially equal to said second beat frequency, means for controlling the phase of said reference oscillations in response to the carrier waves of said transmitted pulses, means for combining said reference oscillations and said object - returned pulses to obtain pulse signals superimposed upon said reference oscillations, means for detecting said combination to obtain video pulses, and means for indicating at least a portion of said video pulses.

6. The system of claim 4, wherein said reference oscillations are of a frequency equal to said beat frequency.

ROBERT A. McCONNELL.

References Cited in the file of this patent

UNITED STATES PATENTS

| Number | Name | Date |
|---|---|---|
| Re. 21,955 | Chaffee | Nov. 25, 1941 |
| 2,408,742 | Eaton | Oct. 8, 1946 |
| 2,435,615 | Varian | Feb. 10, 1948 |
| 2,543,448 | Emslie | Feb. 27, 1951 |